United States Patent
Kakinami et al.

(10) Patent No.: US 6,476,730 B2
(45) Date of Patent: Nov. 5, 2002

(54) ASSISTANT APPARATUS AND METHOD FOR A VEHICLE IN REVERSE MOTION

(75) Inventors: Toshiaki Kakinami; Shoji Kawata, both of Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/794,322

(22) Filed: Feb. 28, 2001

(65) Prior Publication Data

US 2001/0026317 A1 Oct. 4, 2001

(30) Foreign Application Priority Data

Feb. 29, 2000 (JP) ......................................... 2000-054237

(51) Int. Cl.[7] .................................................. B60Q 1/48
(52) U.S. Cl. ...................... 340/932.2; 340/435; 340/903
(58) Field of Search ............................. 340/932.2, 937, 340/435, 437, 438, 441, 903; 348/148, 149

(56) References Cited

U.S. PATENT DOCUMENTS

| | | | | |
|---|---|---|---|---|
| 4,931,930 A | * | 6/1990 | Shyu et al. | 364/424.01 |
| 4,937,796 A | * | 6/1990 | Tendler | 367/116 |
| 5,612,686 A | * | 3/1997 | Takano et al. | 340/903 |
| 5,646,614 A | * | 7/1997 | Abersfelder et al. | 340/932.2 |
| 5,670,935 A | * | 9/1997 | Schofield et al. | 340/461 |
| 5,742,141 A | * | 4/1998 | Czekaj | 318/587 |
| 5,793,308 A | * | 8/1998 | Rosinski et al. | 340/903 |
| 5,931,253 A | * | 8/1999 | Shimizu et al. | 180/204 |
| 5,949,331 A | * | 9/1999 | Shofield et al. | 340/461 |
| 6,218,960 B1 | * | 4/2001 | Ishikawa et al. | 340/901 |
| 6,223,847 B1 | * | 5/2001 | Shimizu et al. | 180/204 |
| 6,186,259 B1 | * | 6/2001 | Shimizu et al. | 180/204 |
| 6,259,359 B1 | * | 7/2001 | Fujinami et al. | 340/435 |

FOREIGN PATENT DOCUMENTS

| | | |
|---|---|---|
| JP | 59-201082 | 11/1984 |
| JP | 7-17328 | 1/1995 |
| JP | 8-2357 | 1/1996 |
| JP | 11-334470 | 12/1999 |
| JP | 11-339194 | 12/1999 |
| JP | 2000-78566 | 3/2000 |
| JP | 2000-79860 | 3/2000 |
| JP | 2000-280823 | 10/2000 |

* cited by examiner

*Primary Examiner*—Jeffery Hofsass
*Assistant Examiner*—Son Tang
(74) *Attorney, Agent, or Firm*—Sughrue Mion, PLLC

(57) ABSTRACT

A parking assist apparatus which enables even an inexperienced driver to park with no difficulty or anxiety assists the parking operation by taking an image rearwardly of a vehicle during the parking operation by a camera, indicating an estimated locus of the vehicle overlapping with the rearward images on a display, indicating a first estimated locus in accordance with a steering angle of the vehicle at an initial stage of the parking operation on the display, fixing the first estimated locus at a predetermined condition to have the locus as an target locus, indicating the second estimated locus varied in accordance with the change of the steering angle during the parking operation on the display, and guiding the second estimated locus to be in accord with a fixed target locus.

27 Claims, 14 Drawing Sheets

Interruption of phase A signal of steeringsensor (steering sensor signal transaction)

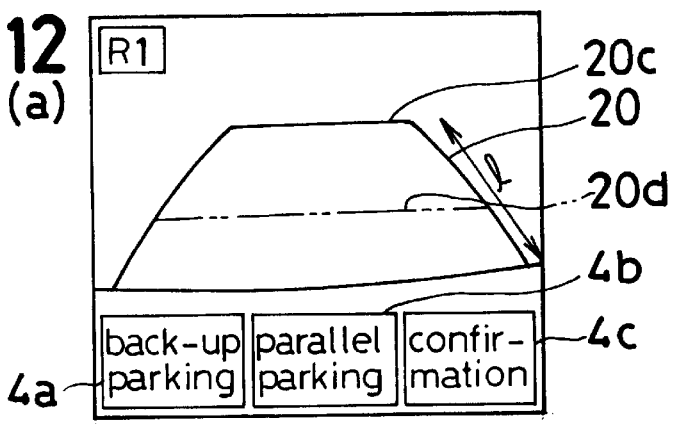
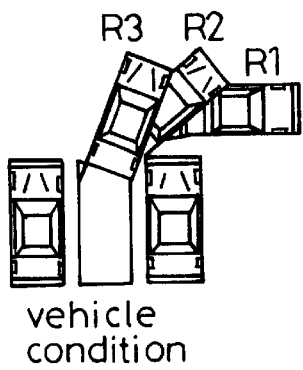
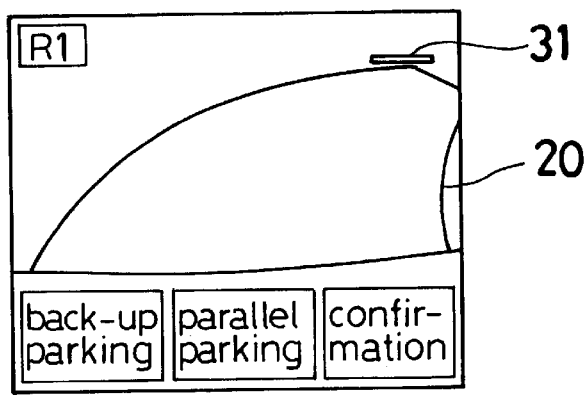
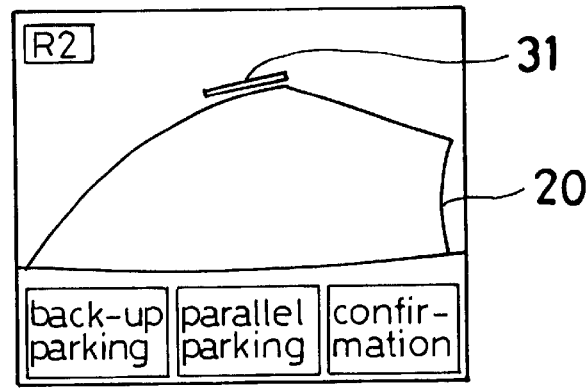
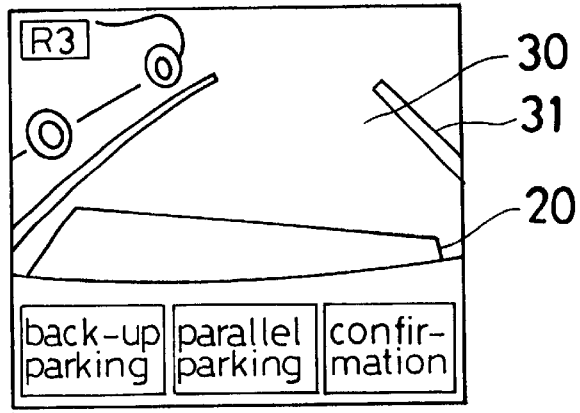

(d)

vehicle condition (a)

(b)

(c)

When a vehicle is turned determing θ as R(1−cos θ)×2 = D parallel parking can be performed

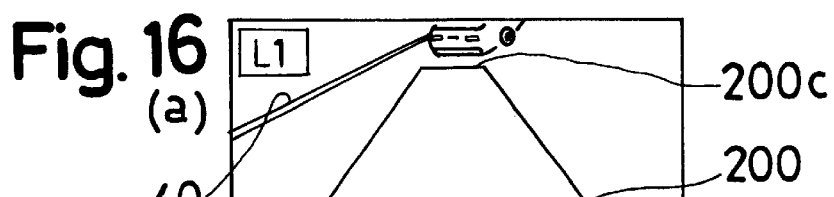
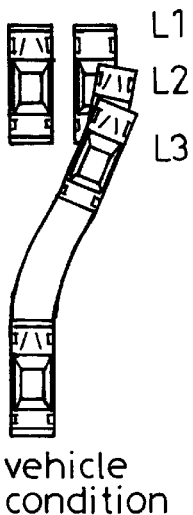
Fig. 16 (e) vehicle condition
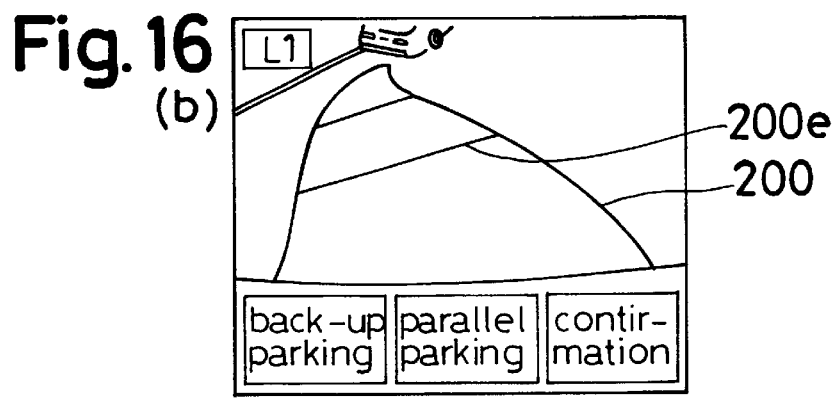
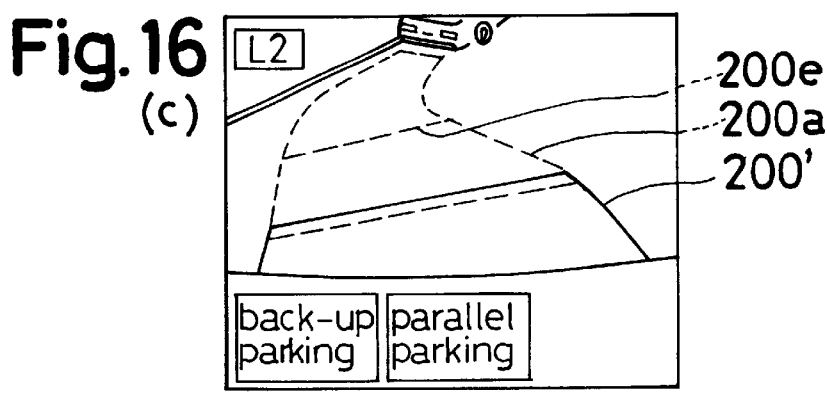
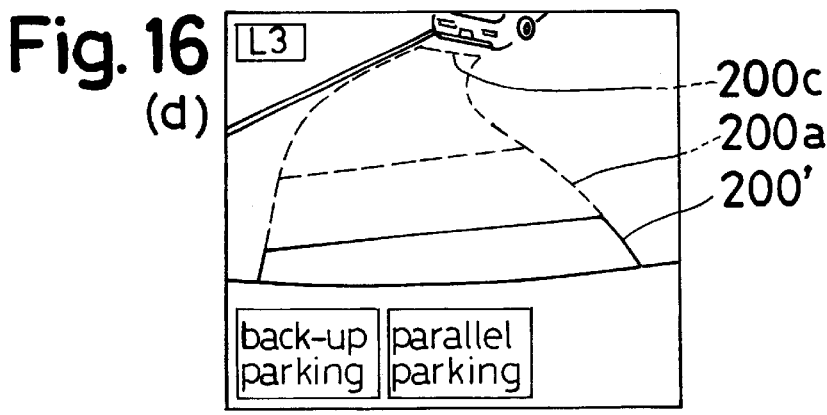

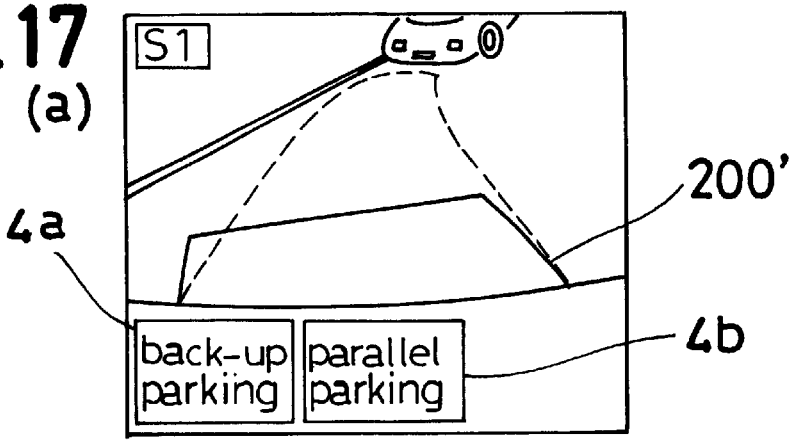
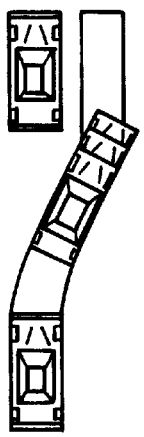
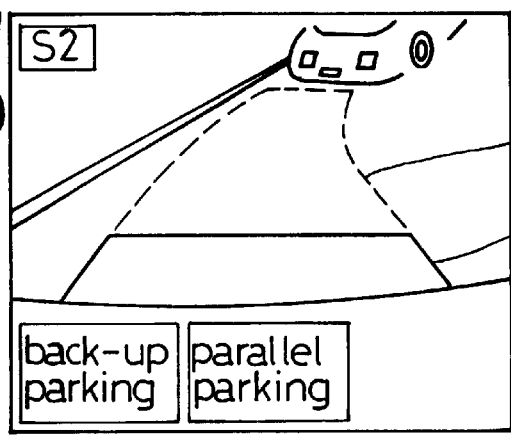
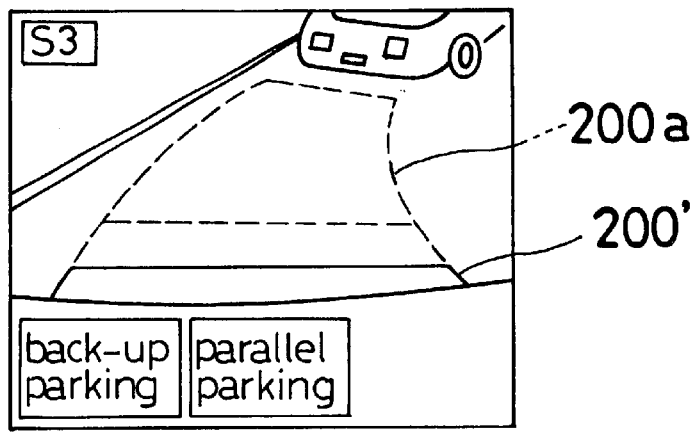
Fig. 17 (a)
Fig. 17 (d)
Fig. 17 (b)
Fig. 17 (c)

vehicle condition

ASSISTANT APPARATUS AND METHOD FOR A VEHICLE IN REVERSE MOTION

BACKGROUND OF THE INVENTION

1. Field of the Invention

The invention relates to an assistant apparatus and method for a vehicle in reverse motion, and more particularly to an assistant apparatus and method for a vehicle driver to drive the vehicle in reverse by means of a camera taking a rearward image from the vehicle and a display showing an estimated reverse motion locus of the vehicle superimposed onto the image when the driver parks the vehicle and drives the car into a turnout temporarily.

2. Description of the Related Arts

Conventionally, methods of assisting the parallel parking and pulling in parking such as into a garage for an inexperienced driver are well known. In Japanese Patent Laid-open Publication No. H07-17328, a CCD camera and a distance sensor for measuring the distance are provided on a vehicle body and the environment around the vehicle is detected to show the driver a bird's eye view of the surrounding scene from the vehicle on the display in the vehicle.

In a Japanese Patent Laid-open Publication No. S59-201082, a method for detecting the steering angle by a steering sensor and calculating the steering wheel angle for output to the display is disclosed. In another Japan Patent Laid-open Publication No. H08-2357, a method for measuring a distance between the vehicle and an obstacle (especially an already parked vehicle next to a parking space) by a distance sensor for object detection provided on the rear of the vehicle and detecting a position for starting turning of the wheels by the maximum steering angle in accordance with the distance to inform the driver of the timing for initiating steering operation is disclosed.

However, the conventional methods mentioned above require detecting the obstacles around the vehicle using various sensing technologies, which complicates a system for transaction. In addition, the method for measuring and informing the driver of the distance between the vehicle and the obstacle by the distance sensor does not necessarily assist parking especially when another vehicle is not parked next to the parking space and when obstacles suddenly occur such as a person suddenly approaching the vehicle during a parking operation.

SUMMARY OF THE INVENTION

It is, therefore, an object of the present invention to obviate the above drawbacks of the prior arts.

It is a further object of the present invention to provide an assistant apparatus and method for a vehicle in reverse motion which enables an inexperienced driver to execute the parking operation with no difficulties and worries and which appropriately assists the parking operation.

According to the present invention, the assistant apparatus includes a camera taking the images rearwardly from the vehicle during the parking operation, an indication means showing the image from the camera as a rearward image, a vehicle condition detecting means detecting the vehicle condition, and an estimated locus calculating means calculating an estimated locus for vehicle driving based on the information from the vehicle condition detecting means and the vehicle performance to show the estimated locus overlapping with the rearward image on the indication means, wherein the technical means further includes a locus fixing means showing a first estimated locus in accordance with the steering angle at an initial stage and fixing the first estimated locus at a predetermined condition, a target locus setting means setting the first estimated locus as a target locus when the first estimated locus is fixed by the locus fixing means, and a guiding means showing a second estimated locus varied in accordance with the change of the steering angle during the parking operation on the indication means to guide the second estimated locus to the target locus.

The effects of the assistant apparatus for the vehicle in reverse motion are as follows. Indicating the first estimated locus in accordance with the steering angle at an initial stage of the parking operation, fixing the first estimated locus under a predetermined condition (it is fixed by the driver) to set the first estimated locus as the target locus, showing the second estimated locus varied in accordance with the steering angle during the parking operation on the indication means to enable guidance of the second estimated locus to the fixed target locus, operating the steering wheel by guiding the second estimated locus to agree with the standardized target locus. This does not require any complicated operation under any parking circumstances. For instance, since it is not necessary to maintain the steering wheel nervously for a predetermined period during the parallel parking, even an inexperienced driver is able to carry out the parking easily.

In this case, when the direction is informed based on the information from the vehicle condition detecting means and the target locus, the guiding means calculates the difference from the target locus based on the information from the fixed target locus and the vehicle condition detecting means (such as the condition of the shift lever, the steering condition, and traveling condition), which provides appropriate directions in accordance with the calculated difference or the positional relations between the fixed and target locus to provide an apparatus appropriately assisting the parking operation.

The predetermined condition can be set as follows:

When there are no obstacles in the range of the first estimated locus and when the first estimated locus is indicated in the direction which the driver intends to park, the first estimated locus is fixed to park the vehicle based on such conditions after confirming the driver's intention to park and confirming the safety for the parking operation.

According to the present invention, an assistant apparatus for a vehicle in reverse motion includes a camera taking a rearward image from the vehicle during the reverse motion, a detecting means for detecting a vehicle's reverse motion, a calculating means for calculating an estimated reverse motion locus based on the vehicle condition and vehicle characteristics, and a display showing the latest estimated reverse motion locus as a present locus and one of the estimated reverse motion loci at a specific timing as a target locus, both the current and the target locus being superimposed onto the rearward image.

Further, according to the present invention, an assistant apparatus for a vehicle in reverse motion includes a camera continuously taking a rearward image from the vehicle during the reverse motion, a detecting means for detecting a vehicle condition of reverse motion, a calculating means for calculating an estimated reverse motion locus based on the vehicle condition and vehicle characteristics, and a display showing the estimated reverse motion locus superimposed onto the rearward image, wherein one of the estimated reverse motion loci at a specific timing is fixed as a target locus on the display, and the estimated reverse motion locus is continuously shown on the display even after the target locus is fixed.

Furthermore, according to the present invention, an assistant method for a vehicle in reverse motion includes a first step for continuously taking a rearward image from the vehicle during the reverse motion, a second step for continuously detecting a vehicle condition of reverse motion, a third step for continuously calculating an estimated reverse motion locus based on the vehicle condition and vehicle characteristics, and a fourth step for continuously showing the estimated reverse motion locus superimposed onto the rearward image, a fifth step for fixing one of the estimated reverse motion loci at a specific timing as a target locus on the display, and a sixth step for further continuously showing the estimated reverse motion locus on the display even after the target locus is fixed.

BRIEF DESCRIPTION OF THE DRAWINGS

FIGS. 12(a)–(e) are operation explanatory views of back up parking in the embodiment of this invention;

FIGS. 16(a)–(e) are operational explanatory views for the parallel parking in the embodiment of this invention;

FIGS. 17(a)–(d) are operational explanatory views for the parallel parking as a follow up to FIG. 16 in the embodiment of this invention.

DESCRIPTION OF THE PREFERRED EMBODIMENT

Figure 1:
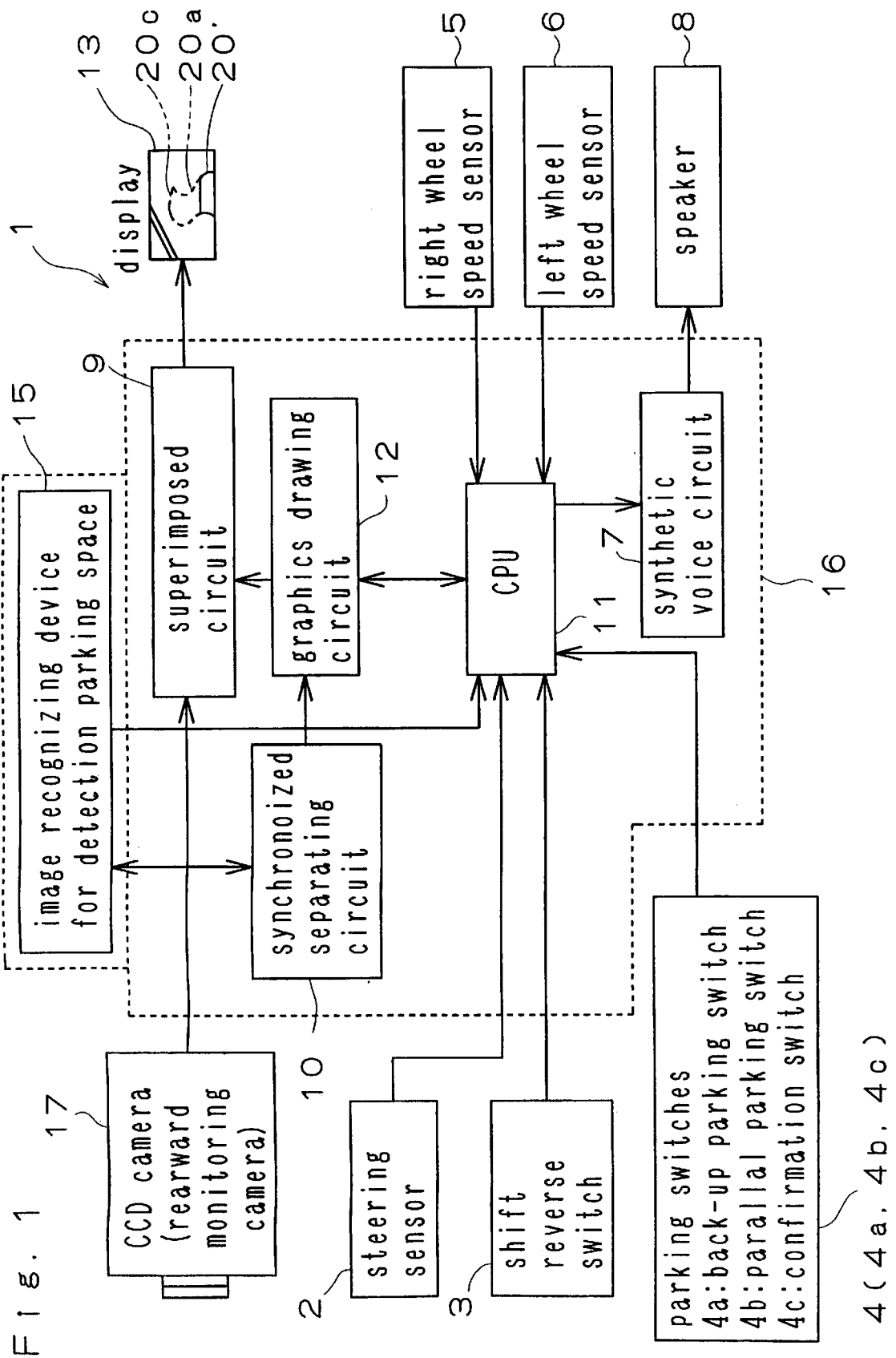
FIG. 1 is a system block diagram of an assistant apparatus for a vehicle in reverse motion (e.g., a parking assist apparatus) of an embodiment of this invention.

An embodiment of an assistant apparatus for a vehicle in reverse motion (e.g., a parking assist apparatus) of this invention is described as follows referring to FIGS. 1 through 18. FIG. 1 shows a block diagram of a parking assist apparatus 1. As shown in FIG. 1, the parking assist apparatus 1 comprises a CCD camera 17 (hereinafter called camera) taking images rearwardly of a vehicle (shown in FIG. 2), a steering sensor 2 detecting the steering wheel angle (also called as turning angle) of a steering wheel 21, a shift lever reverse switch 3 detecting the condition of the reverse mode of transmission shift lever, parking switches 4 (including a back up parking switch 4a, a parallel parking switch 4b, and a confirmation switch 4c) guiding the vehicle in a parking lot or in a garage (herein after called "back up parking") and guiding the vehicle backing into a parking space along the street immediately in the rear of another vehicle (hereinafter called "parallel parking"), and indicating a locus 20 obtained based on the vehicle driving conditions and fixing the locus 20 under a predetermined condition to assist parking operation, and wheel speed sensors 5, 6 detecting the speed of right and left driven wheels. The parking assist apparatus 1 further includes a controller 16 for controlling the parking assist operation by receiving signals from the camera 17, the steering sensor 2, shift lever reverse switch 3, parking switches 4, and the wheel speed sensors 5, 6.

The controller 16 is capable of displaying the image rearwardly of the vehicle and an estimated driving locus 20 (20a, 20c, 20') on a display 13 based on these signals. A synthetic voice function is provided on the parking assist apparatus 1. The synthetic voice function includes a synthetic voice circuit 7 outputting the synthetic voice recorded in advance in the memory and a speaker 8 delivering the output of the synthetic voice to the driver.

The controller 16 comprises a CPU 11, a graphics drawing circuit 12 drawing the graphics on the display 13, a superimposed circuit 9 combining the graphics signal and the image rearwardly of the vehicle from the camera 17, synchronized separating circuit 10 for extracting a synchronized signal from the image taken by the camera for supply to the graphics drawing circuit 12, and an image recognition device 15 for detecting a parking space and conducting the image recognition of a parking space or spot 30 by receiving a signal from the camera 17. The image recognition device 15 can be separately provided from the controller 16.

Although parking switches 4 for back up, parallel and confirmation are provided with the touch panel display in this embodiment, it is not limited to this type. The switches may be separately provided from the display. Steering angle indication markers may be provided on the display for turning the light on according to the condition of the steering angle. One of the lights of the indication marker, left, right, or middle is lit depending on the condition of the steering angle. The turning direction of the steering wheel 21 can be displayed along with the rearward image. The steering angle in this case can be either the steering angle when the steering wheel 21 is turned from a neutral position or the actual steering angle of right and left wheels in an ongoing direction. The synthetic voice indicated here outputs recorded sounds in the memory of the CPU from the speaker 8 in accordance with the relative position between the vehicle and parking space 30 for guiding the driver to assist the parking operation by alerting or indicating with a synthetic voice.

Figure 2:
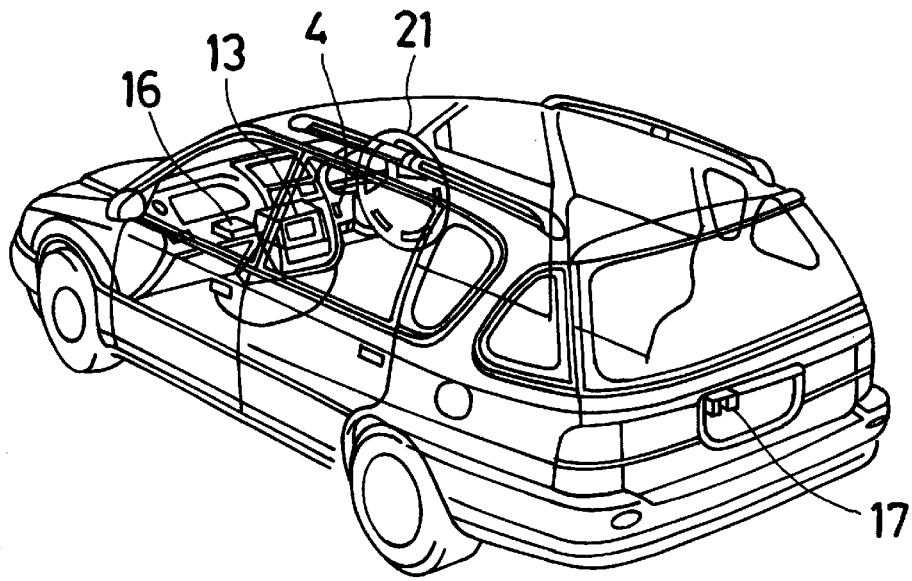
FIG. 2 is a perspective view of a vehicle showing the parking assist apparatus of the embodiment of this invention being installed.

FIG. 2 shows a view when the parking assist apparatus 1 is installed in the vehicle. The camera 17 taking images rearwardly of the vehicle is attached at approximately top center of a license plate. Light axis is directed downwardly from the horizontal direction. In details, the camera 17 is placed on the center of the rear end of the vehicle to have the light axis approximate 30° downwardly from the horizontal direction. The camera 17 ensures the view range of 140° with a wide-angle lens for taking images of approximately 8 meters rearward of the vehicle.

The display 13 is provided on the panel of a center console in the interior of the vehicle. The controller 16 is provided on the upper portion of a glove compartment. The parking switches 4 directing the parking assistance are provided near the center console for the driver's convenience.

Figure 3:
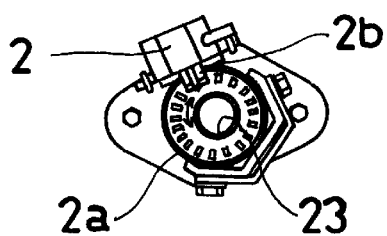
FIG. 3(a) is a plan view of the steering sensor installed on a steering column shaft and FIG. 3(b) is a perspective view showing an overview of a disc plate of the steering sensor and a photo interrupter.
Figure 3:
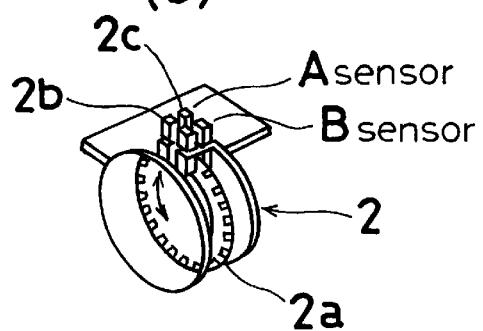
Figure 4:
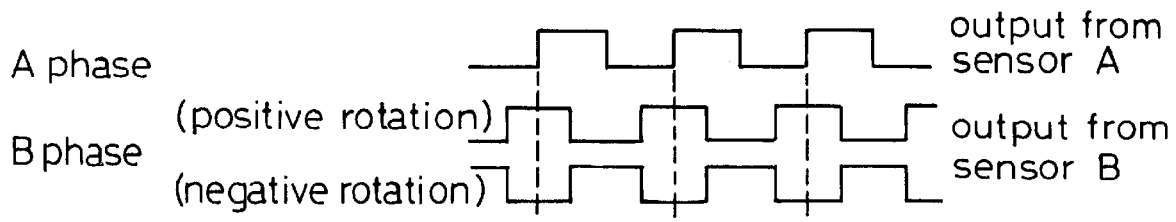
FIG. 4 is a timing chart showing an output of phase A and phase B of the steering sensor shown in FIG. 3.

The structure of the steering sensor 2 will be explained referring to FIG. 3. A commonly used steering sensor 2 detecting the steering angle of the steering wheel 21 is employed. The steering sensor 2 comprises a disc plate 2a having a plurality of slits thereon and rotating as one unit with the steering column shaft 23 and two pairs of photo interrupters 2c, 2b having 90° phase differential each other. In this structure, rotating a plurality of slits provided on a disc plate 2a in a peripheral direction for turning on/off a photo transistor by passing or blocking the light, two pulse signals of A phase and B phase are outputted (refer to FIG. 4). The phase B is outputted either delayed or advanced 90° relative to the phase A in accordance with the rotation direction of the steering wheel 21. In this case, the steering angle is 1° per one pulse.

The operation of the controller 16 will be explained referring to FIG. 5. A program shown in FIG. 5 of the controller 16 is carried out by turning on a switch such as an accessory switch (not shown) provided on the vehicle. In Step S101, each initial value of memory necessary for the transaction is determined. In Step S102, the condition of the shift reverse switch 3 is examined. When the shift reverse switch 3 does not indicate the reverse condition (the shift reverse switch 3 is off), the transaction after Step S102 is not conducted and the transaction does not proceed to parking assistance operation. When the shift reverse switch 3 is on, the operation moves to Step S103. The intent of the driver is judged from the condition of the parking switch 4 provided on the display whether he or she selected normal back up parking or parallel parking. When the parallel parking switch shown in FIG. 12 is pressed in Step S103, the operation moves to Step S104. When the back up parking switch is selected, the operation moves to Step S118.

Back-up Parking

Figure 6:
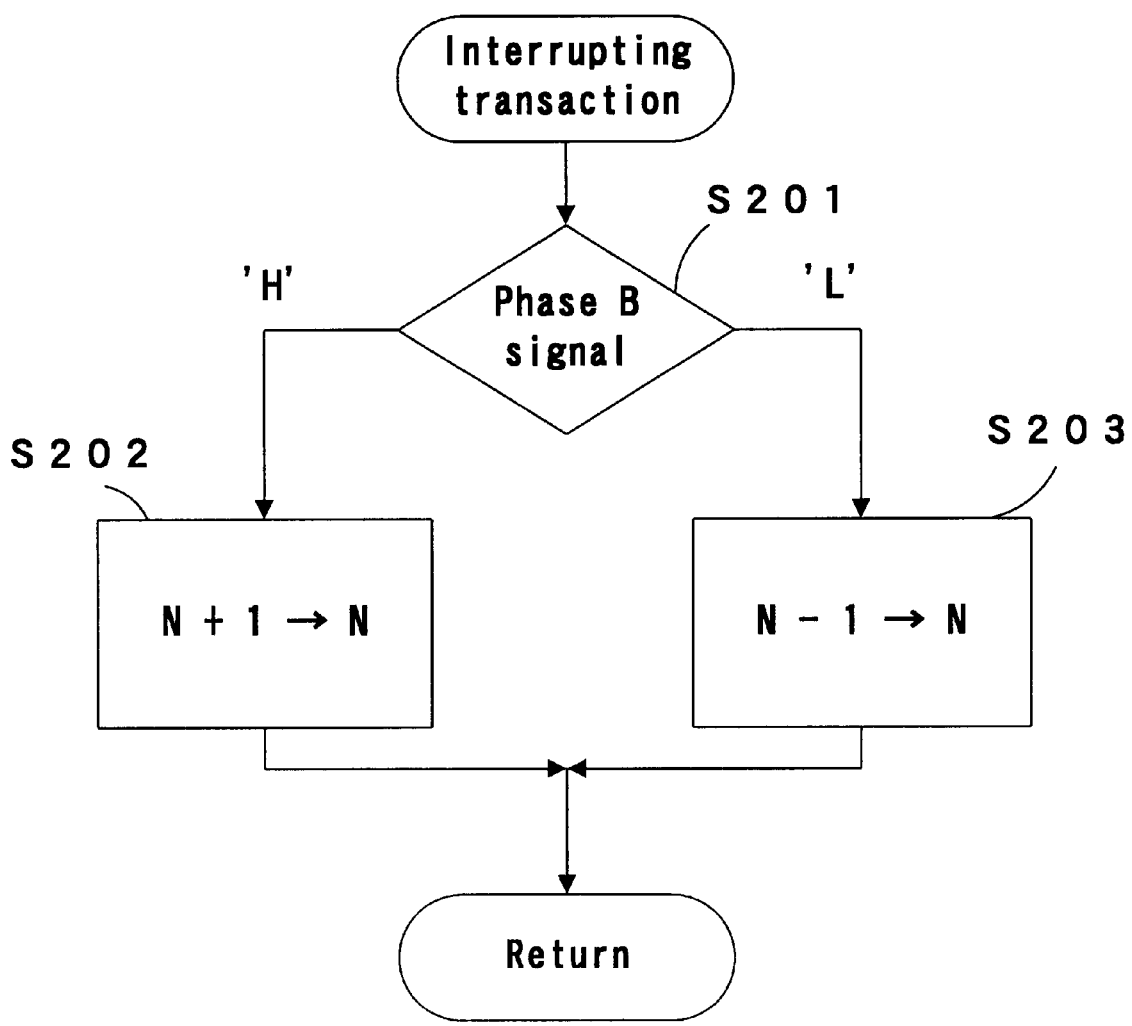
FIG. 6 is a flowchart showing a steering sensor pulse transaction of the controller in the embodiment of this invention.

The transaction for the back up parking will be explained as follows. When the back up parking switch 4a is selected, a steering sensor value N (a steering counter value N) is read in from the steering sensor 2 in Step S118. A turning radius R during parking operation is calculated based on the steering sensor value N. In practice, an interruption transaction interrupting the main program as shown in FIG. 6 is conducted when detecting the leading edge of A phase pulse signal. The condition of B phase pulse signal is examined in Step S201 of FIG. 6. When the B phase pulse signal shows high electric potential, the steering count value N is incremented in Step S202 to memorize the value in the memory. When the B phase pulse signal shows low electric potential the steering count value N is decrimental to memorize the value in the memory. In this case, the steering count value N shows θ=N due to the condition of 1 pulse per one degree.

Figure 7:
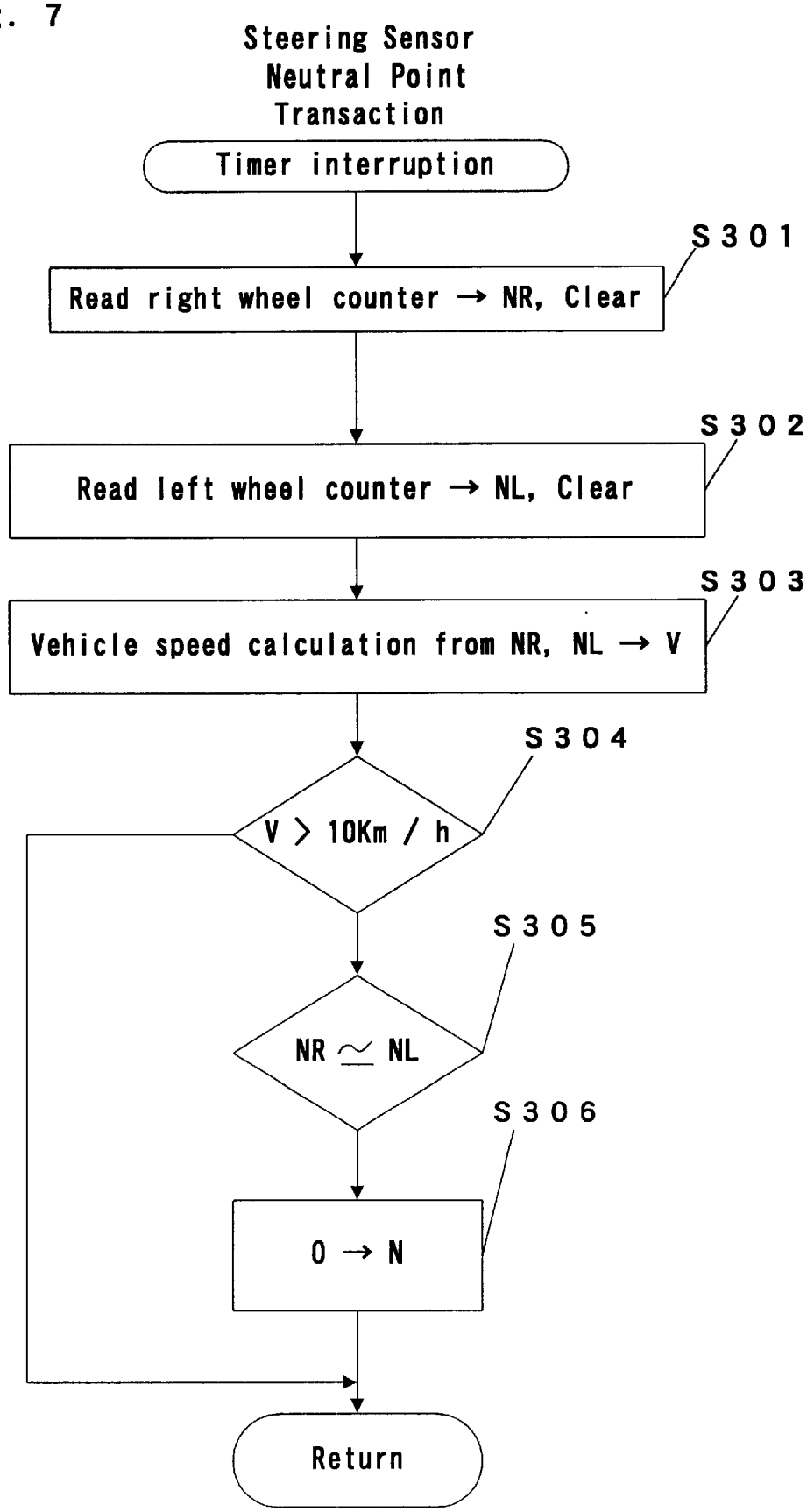
FIG. 7 is a flowchart showing a neutral point transaction of the steering sensor of the controller in the embodiment of this invention.

Since the absolute steering angle of the steering wheel 21 is not determined only by the count of the steering value N mentioned above, a neutral point of the steering angle is detected by. a neutral point transaction shown in FIG. 7 to determine the neutral point as N=0. The determination of the neutral point will be explained referring to FIG. 7. The transaction is carried out by a timer interruption with a one second cycle. The vehicle speed is usually calculated by signals from wheel speed sensors 5, 6, provided on wheels. In Step S301, Step S302, the pulse signals from the wheel speed sensors 5, 6 provided on both right and left sides are counted by a hardware counter installed in the CPU 11 in the controller. The wheel speed of both right and left sides is read out by the timer interrupting routine to memorize the wheel speed sensor values in memories NR, NL. After reading out the counter is cleared to the initial condition and the NR and NL indicate the number of pulses per second.

In Step S303, the average value between NR and NL is calculated as (NR+NL)/2. Then a vehicle speed V is calculated by multiplying the peripheral length of a tire to the average value between NR and NL. For establishing a standard for the steering sensor 2, the neutral point of the steering angle is obtained by presuming the vehicle is going straight ahead when the pulse differential is very little between the wheel speed sensors 5, 6 provided on both right and left sides at vehicle speed V of more than a predetermined speed (for example, 10 Km/h) in Step S304 through S306 and by resetting the steering counter N to zero in Step 306.

Figure 5A:
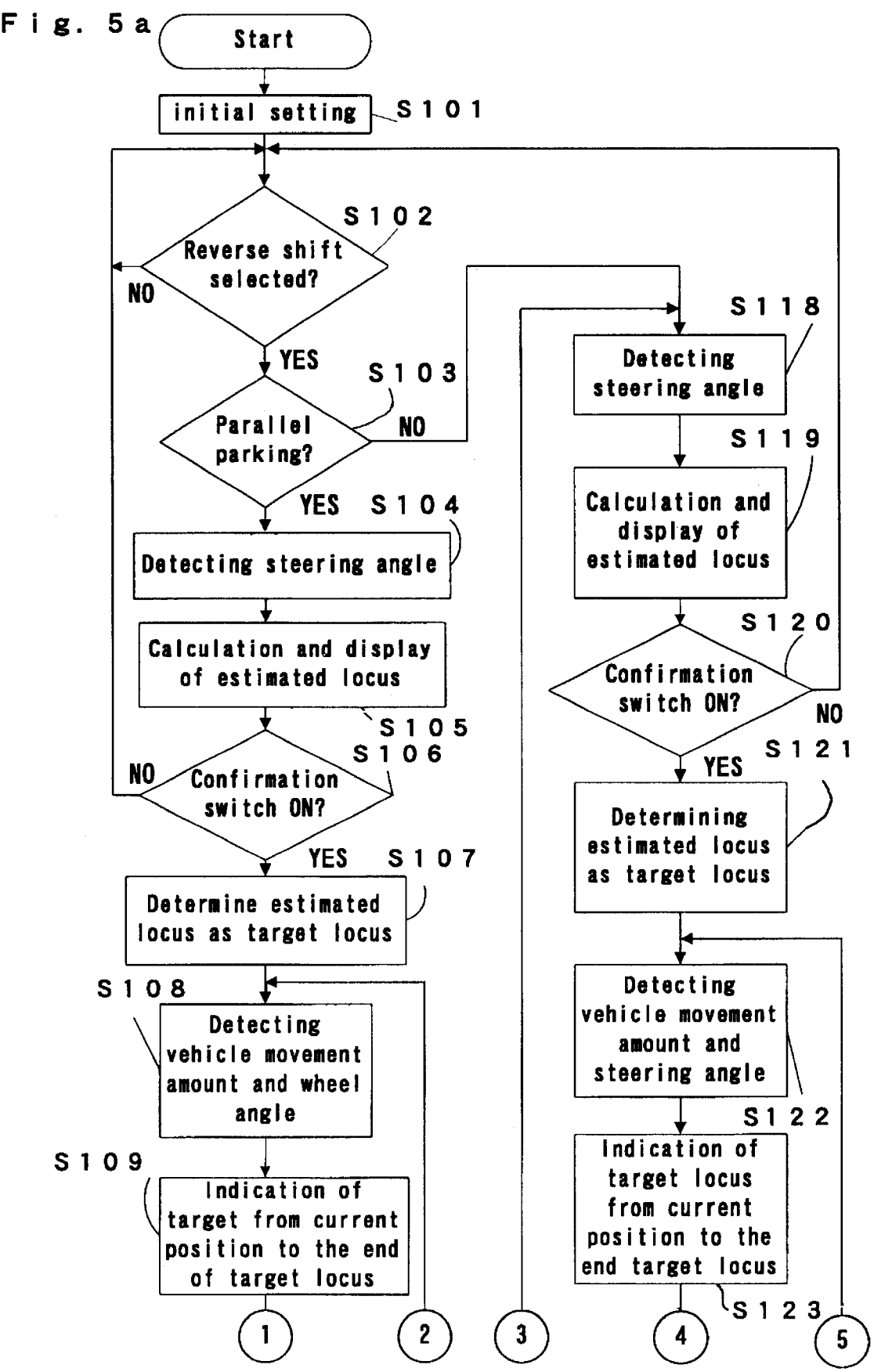
FIG. 5 is a flowchart showing a transaction of a controller during parking operation in the embodiment of this invention.
Figure 5B:
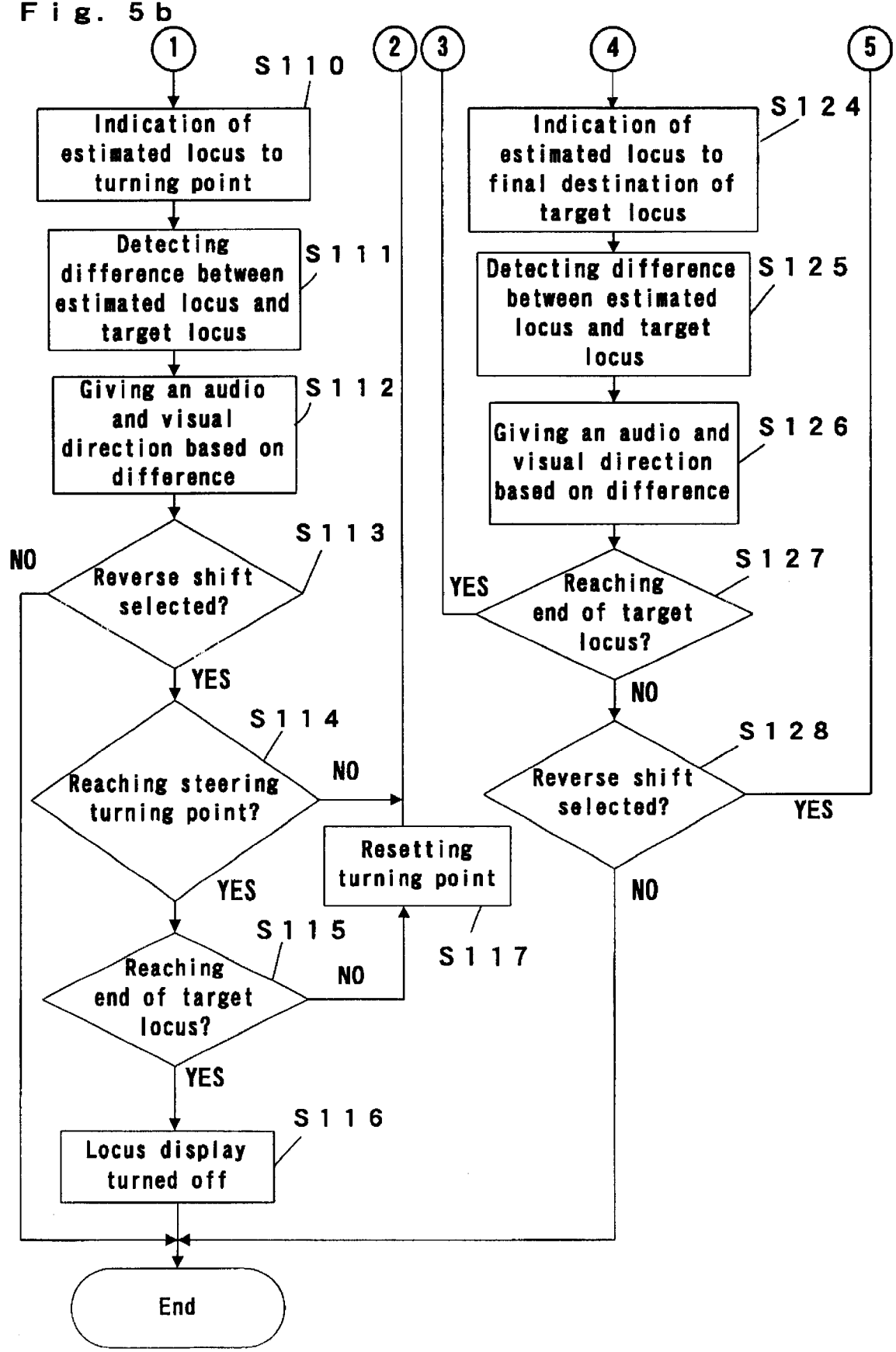

When the steering angle θ is obtained, the transaction returns to the main routine of FIG. 5. In Step 119, the estimated driving locus 20 (20a, 20') is calculated and indicated. How to obtain the estimated driving locus 20 (20a, 20') will be explained as follows.

Figure 8:
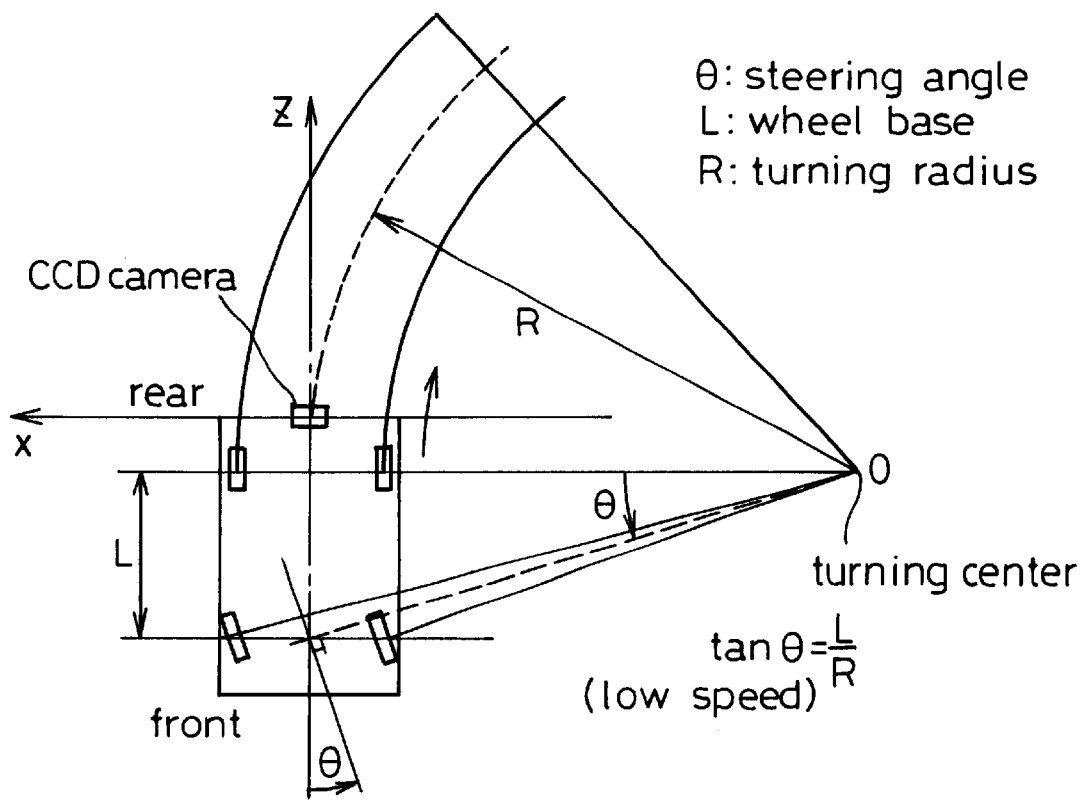
FIG. 8 is an explanatory view used for calculating estimated driving locus of the embodiment of this invention.

As shown in FIG. 8, a turning center O at low speed (defined less than 10 Km/h) exists on an extension line from the rear vehicle axis. According to the geometrical relations, the turning radius R is obtained from the equation of R=L/tan θ (based on the vehicle performance such as steering angle being defined as θ, wheel base of the vehicle being defined as L). In this case, when the steering angle θ is defined as θ=0, the vehicle is going straight ahead and R becomes R=∞.

Figure 9:
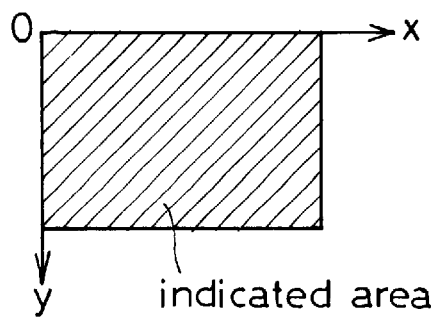
FIG. 9 is a graphics display indicating coordinates of a camera and a display in the embodiment of the invention.
Figure 10:
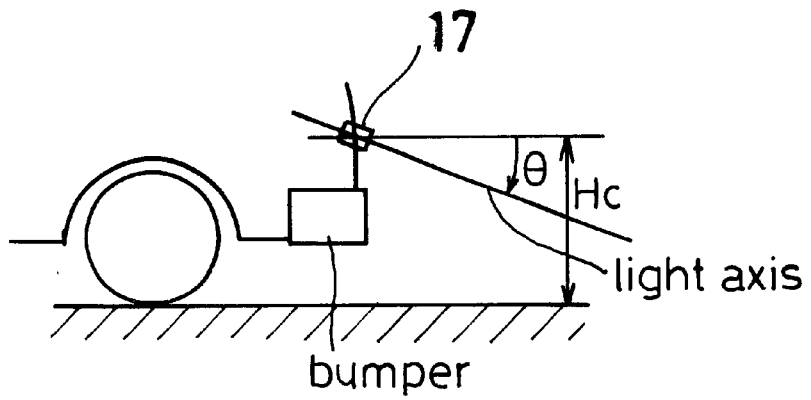
FIG. 10 shows a camera of the parking assist apparatus mounted on the vehicle in the embodiment of this invention.
Figure 11:
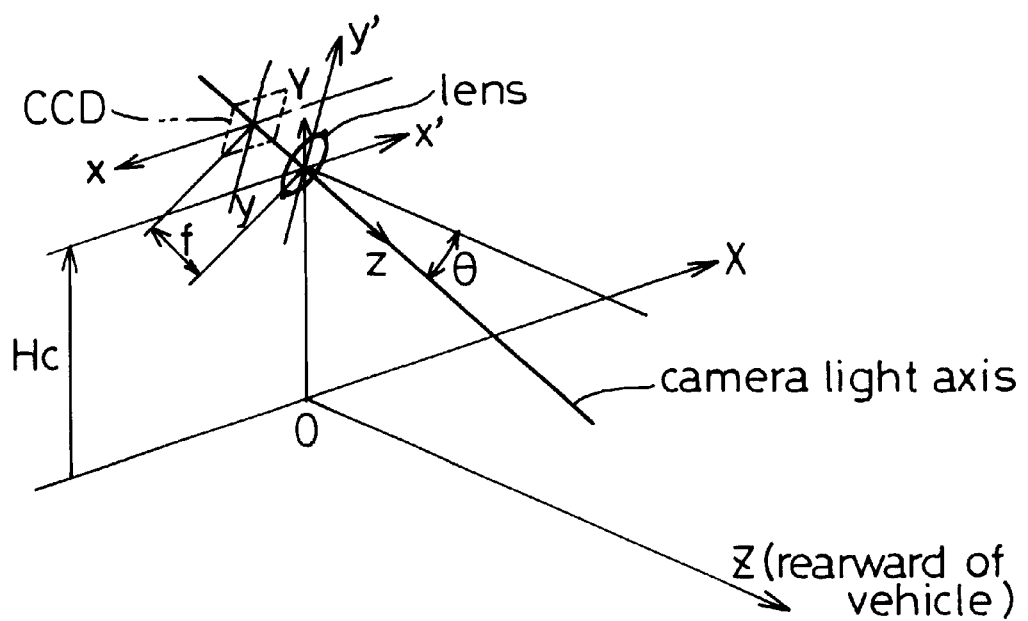
FIG. 11 is an explanatory view explaining a coordinates converting method of the parking assist apparatus in the embodiment of this invention.

FIG. 9 shows a graphic indication of coordinates (x, y) on the camera. FIG. 11 shows coordinate transformation process. The camera 17 is equipped at a height of Hc from the road surface for tilting the light axis downwardly by 30° (θ=30°) from the horizontal direction. A wide-angle lens is employed in the camera 17. The focus depth is deep with this lens and the lens is structured for drawing the image of the road on the CCD device. Accordingly, the following relation is defined between the road surface coordinate systems (x, z) and the display coordinate systems (x, y).

The following conditions are predetermined. (x, y, z): road surface coordinates, (x, y): camera coordinates of CCD element surface, f: lens focus distance of camera, (x', y', z'): lens coordinates, 0: camera installation angle, and Hc: height of camera position from the road surface.

According to the above mentioned conditions, the following equations are defined.

$$x=f \cdot x'/z', \quad y=f \cdot y'/z' \tag{1}$$

Assuming the value x'=X, the equations $$y'=Z \sin θ+(Y-Hc)\cos θ \tag{2}$$

and $$z'=Z \cos θ-(Y-Hc)\sin θ \tag{3}$$

are defined.

When the coordinate system is limited to the road surface Y=0 is defined and x and y will be obtained as follows:

$$x=f \cdot X/(Z \cos θ+Hc \cdot \sin θ) \tag{4}$$

$$y=f \cdot (Z \sin θ+Hc \cos θ)/(Z \cos θ+Hc \cdot \sin θ) \tag{5}$$

Accordingly, the coordinates (x, y) on the graphics screen of the display are obtained from equations (4) and (5) by the point (X, Z) on the road surface as taken by the camera 17.

The estimated driving locus 20 of the coordinates (x, y) obtained from the above mentioned method is displayed on the display (the color of the estimated driving locus 20 being, for example: yellow), as shown in FIG. 12. FIG. 12 shows the locus 20 of back up parking in a garage or an L-shaped parking maneuver. In this case, a length 1 (the depth of the estimated driving locus 20 in longitudinal direction) of the estimated driving locus 20 can be fixed (for example 3 meters for the back up parking). The color can be differentiated between a turning condition and a going straight ahead condition. The color of the end 20*c* of the estimated driving locus 20 can be distinguished from the estimated driving locus 20 with a different color.

In Step S120, the end (including a tip portion) 20*c* of the estimated driving locus 20 is fitted within the white lines of the parking space 30 in which the driver intends to park and the driver judges if it is possible to park. When it is judged that the vehicle can be securely parked within the space in the white lines, the confirmation switch 4*c* on the display is selected by the driver. After pressing the confirmation switch 4*c*, the indication for the confirmation switch is turned off. However, when the confirmation switch 4*c* is not pressed, it is judged that an accurate parking operation cannot be conducted and the step is returned to Step S102 to repeat the transaction after Step S102. When the confirmation switch 4*c* is selected, the transaction moves to Step 121. During back up parking, by pressing the confirmation switch 4*c* when the direction of the estimated driving locus 20 in accordance with the steering angle is fitted into the parking space that the driver intends to park in and on the condition that an obstacle (such as objects, other vehicles or a person) do not exist within the range of the estimated driving locus 20 indicated with the vehicle width, the driver can confirm that an obstacle do not exist within the range of the estimated driving locus 20, which indicates the driver's intention to fix the locus.

When the confirmation switch 4*c* is pressed, the indication on the screen is off. The locus 20 appearing on the screen then is defined as a target locus 20*a* which becomes a standard for assisting the parking operation. The indication color of the target locus 20*a* may be changed from yellow to blue in accordance with the change of the condition from an unconfirmed condition to a confirmed condition. A reference line 20*d* (for example indicated in red) showing a position at a predetermined distance (for example 50 centimeters) rearward from the bumper is indicated relative to the vehicle width direction. The reference line 20*d* provides the driver with an approximate sense of distance from the obstacle in the rearward image indicated on the display. The indication is visualized so that the driver can pay attention to the highly risky area where the bumper may easily contact the obstacle. A standard line 20*e* for turning steering position showing the steering wheel turning position on the rear of the reference line 20*d* is indicated with the same color as the target locus 20*a* in vehicle width direction on the target locus 20*a*.

In Step S122, the moving distance of the vehicle is calculated by the CPU 11 using the information from the pulse waves outputted from the wheel speed sensors 5, 6. Simultaneously, the steering angle is calculated in the same manner at Step S1218. In Step S123, the direction for showing the target locus 20*a* from the current position to the end 20*c* is outputted from the CPU 11 to the graphics drawing circuit 12 to be indicated on the display 13 via the superimposed circuit 9. In Step S124, an estimated locus 20' of the target locus 20*a* to the end 20*c* is calculated in the same manner with Step S119 to be indicated on the display. In Step S125, a difference in vehicle width direction between the estimated locus 20' variably indicated depending on the steering angle and the fixed target locus 20*a* is calculated in the CPU 11 to give a direction to the driver based on the difference obtained in Step S126.

In Step S127, when the target locus 20*a* reaches the end 20*c* is judged from the moving distance according to the information from the wheel speed sensors 5, 6 on both right and left sides. When the target locus 20*a* does not reach the end 20*c*, the step is returned to Step S118 for repeating Step S118 through Step S127. In Step S127, when the target locus 20*a* reaches the end 20*c* the driver changes the shift lever from reverse to another shift position. The operation of the back up parking is judged to be completed by the position of the shift lever. When the shift lever is still in reverse position, the step is returned to Step S122 for repeating Step S122 through Step S127. When the shift lever is not in reverse position, the indication on the display shows nothing to end the parking transaction.

Parallel Parking

Figure 14:
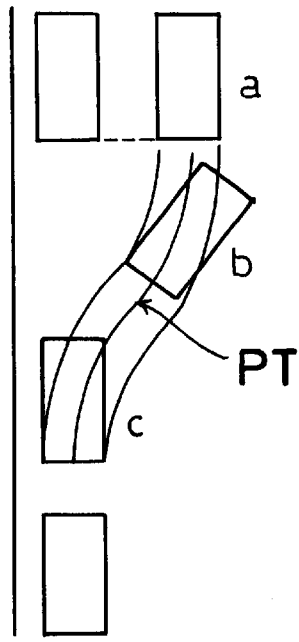
FIG. 14 is an operation explanatory view for parallel parking.

The transaction for the parallel parking will be explained as follows. The driver find a space for the parallel parking along curb side of the street to park the vehicle. Then the driver backs up the vehicle and turns the steering wheel 21 in the direction which the driver wants to park. When the vehicle is backed up to a certain point, the driver turns the steering wheel 21 in the reverse direction to steer the vehicle to the side of the road. The vehicle is parked parallel to a curb 40 at a shoulder of a road and at a sidewalk by parallel parking. As shown in FIG. 14, the vehicle drives on an S-shaped locus including two arcs having different vehicle turning centers. The vehicle is moved by a distance D in the road width direction at the position backed up distance L from the initial stage to be parallel to the side of the road.

Figure 15:
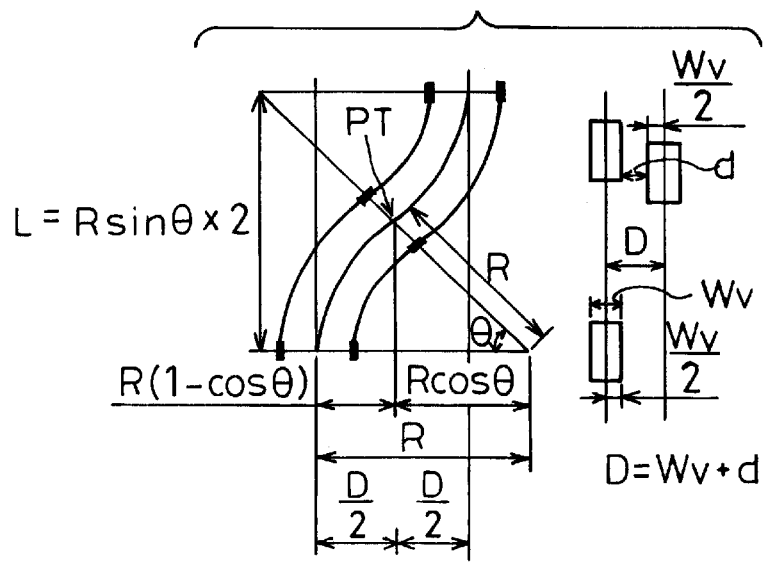
FIG. 15 is an explanatory view for calculating estimated driving locus in the embodiment of this invention.

Geometrically thinking, when the S-shaped estimated locus 200*a* is indicated on the display with the length corresponding to the geometrically determined distance L ($L = R \sin \theta$, for example 6 meters, L is not the curve length) (the turning radius R is defined as R) by the performance characteristics of the vehicle such as the wheel base and the minimum turning radius, it is predictable that the vehicle can be parked in the parking space from the initial stage (Position A of FIG. 14) when the obstacle or another parked vehicle exists at a sufficient distance from the end 200*c* of the moving estimated driving locus 200. When the steering wheel 21 is turned fully or approximate fully at the initial stage for the parallel parking where the vehicle is parallel to another vehicle parked in the manner of the parallel parking, the S-shaped estimated locus 200*a* having two different turning centers and having a turning point PT is indicated. The turning radius R is determined in accordance with the turned amount of the steering wheel 21 according to the vehicle performance characteristics, for example, the steering characteristics. The moving distance L in a front-rear direction necessary for steering the vehicle to the side of the road by a predetermined distance D is determined. Accordingly, converting the coordinates based on the image taken by a camera as a standard is easy as shown in above mentioned method. The turning radius R can be obtained from the information for the steering angle from the steering sensor provided on the steering shaft and the steering gear ratio—wheel base of the vehicle. As shown in FIG. 15, the conditions are defined as follows.

θ: rotation angle from the initial stage for the parallel parking to the turning point PT of the steering wheel 21.

Wv: vehicle width

D: center of vehicle width between a parked vehicle in the manner of the parallel parking and a vehicle intended to be parallel parked by the process of the parallel parking.

The following equation is defined under the above mentioned conditions.

$$D = 2R(1 - \cos \theta)$$

$$D = Wv + d$$

When R=4m is applied, θ=49.5° is obtained. The minimum distance of D to enable parallel parking is D=6.08 meters. The transaction for the parallel parking shown after Step S104 will be explained referring to FIG. 5. The transaction from Step S104 to Step S106 is the same to the transaction (Step S118 and S119) for back up parking. The transaction of the parallel parking starts from the initial stage of the vehicle indicated as position A of FIG. 14. The position A is defined as a position having a predetermined distance d (1 meters) from an objective vehicle parked in the manner of parallel parking. At position A the S-shaped estimated driving locus 200 is indicated on the display by turning the steering, the first estimated driving locus 200 is indicated in the direction that the driver intends for the parallel parking and the condition that the end 200c of the S-shaped estimated driving locus 200 does not overlap with the already parked vehicle rearward of the parking space, and the confirmation switch 4c is pressed when an obstacle (including objects, other vehicles, and persons) does not exist within the estimated driving locus 200. Accordingly, by providing the confirmation switch 4c for the operation of the parallel parking, the estimated driving locus 200 can be fixed as the target locus 200a which reflects the intention of the driver. This indicates the driver's intention for parking.

In Step S108, the moving distance of the vehicle is calculated by the CPU 11 using the information from the pulses outputted from the wheel speed sensor 5, 6 provided on both right and left sides. Simultaneously, the steering angle is obtained by a calculation similar to Step S104. In Step S109, the direction for showing the target locus 200c from the current position to the end 200c of the target locus is outputted from the CPU 11 to the graphics drawing circuit 12 to be displayed on the display via the superimposed circuit 9. In Step S110, the estimated locus 200' to the wheel turning point (corresponding to the turning point) PT shown in FIG. 14 where the steering wheel 21 is turned in the other direction is indicated on the display. This locus 200' is calculated in a similar manner to Step S105. In Step S111, the difference in vehicle width direction between the estimated locus 200' variably indicated by the change of the steering angle and the fixed target locus 200a is calculated in the CPU 11. In Step S112, the direction is given to the driver visually and audibly based on the difference obtained in Step S111.

In Step S113, the condition of the shift lever is judged. When the reverse mode is not selected, it is judged that the parking operation is and the parallel parking transaction shown in FIG. 5 ends. When the shift lever is maintained in reverse mode, whether the vehicle has reached the wheel turning point PT is judged based on the moving distance calculated in Step S114. When the vehicle has not reached the wheel turning point PT, the operation returns to Step S108 to repeat the transaction from Step S108. When the vehicle has reached the wheel turning point PT, whether the vehicle has reached the end 200c of the target locus 200a predetermined at the initial stage for the parallel parking is judged based on the calculated moving distance. When the vehicle has not reached the end 200c of the target locus 200a, the same transaction in Step S108 is repeated after resetting the wheel turning point in Step S117. When the vehicle has reached the end 200c of the target locus 200a it is judged that the parallel parking is completed not to display the locus in Step S116 and to turn off the indication on the display to end the transaction.

Based on the forgoing transactions, a parking sequence of the parking operation of this invention will be explained in order as follows.

In the Case of Back-up Parking

The characteristics of the operation for back up parking are that the driver judges the possibility of parking shown with the estimated driving locus 20, the estimated driving locus 20 is set to the target locus 20a, and the direction is given visually and audibly so that the vehicle traces on the target locus 20a. In this case, the direction for resetting the target locus 20a and the direction for showing only the estimated driving locus 20 can be selected.

Figure 13:
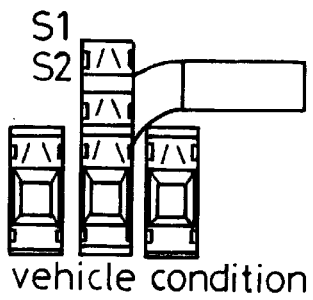
FIGS. 13(a)–(d) are operation explanatory views of back up parking as a follow up to FIG. 12 in the embodiment of this invention.
Figure 13:
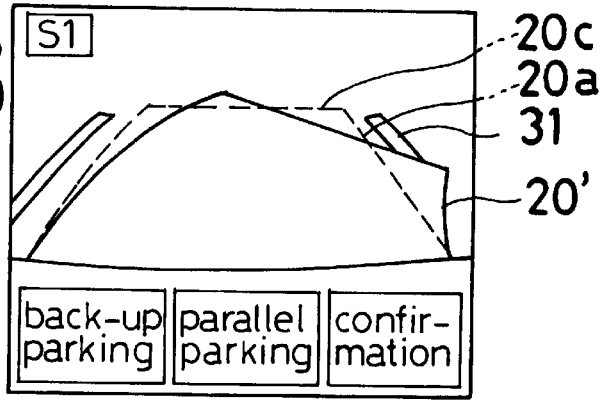
Figure 13:
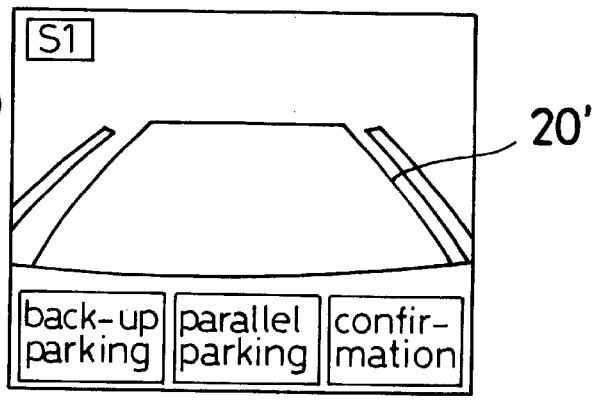
Figure 13:
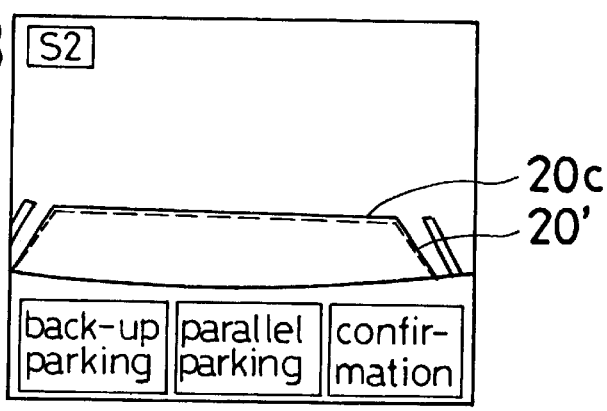

As shown in FIG. 12 and 13, ideally, the vehicle is stopped at the position of R1 shown in FIG. 12(e) approximately 2 meters from the end of a parking line 31 (the initial stage). Selecting the reverse mode at the initial stage, the transaction shown in the flowchart of FIG. 5 starts. In the condition that the steering angle is at the initial straight driving position, the estimated driving locus 20 calculated from the vehicle performance is displayed as shown in FIG. 12(a) on the display. In this condition, the estimated driving locus 20 including the end 20c is colored in yellow. The reference line 20d showing the position 50 centimeters rearward in vehicle width direction is colored in red so that the driver can have a sense of distance rearwardly. Simultaneously, the message saying "direction for back up parking" is outputted from the speaker by the synthetic voice function as well as another message saying "Please turn the wheel to follow the anticipated course to the parking space 30, and press the confirmation button" along with a sound of chime 1. The steering wheel 21 is operated when the vehicle is in the condition of R1, the steering is turned to follow the estimated driving locus 20 to the parking space 30 that the driver intends to park in as shown in FIG. 12(d). The driver presses the confirmation button 4c on the display after the estimated driving locus 20 is fitted into the intended parking space 30. When the confirmation switch 4c is selected, the estimated driving locus 20 becomes the target locus 20a to be fixed. Then the indication color of the target locus 20a turns a blue color.

When the backing up starts, the estimated locus 20' as well as the target locus 20a are shown on the display. After audio message "Please begin backing up now", a sound of chime 2 rings. Another message "Backing up now" is outputted from the speaker 8. In this case, when the vehicle backs up turning right as shown in FIG. 12(b), a further message "Watch to the right rear direction" is outputted from the speaker 8. FIG. 12(c) shows the image when the vehicle is positioned at R2. FIG. 12 (d) shows the image when the vehicle is positioned at R3. Then the vehicle approaches the end 20c of the target locus 20a as shown in FIG. 13. When the vehicle reaches the end 20c as shown in FIG. 13(a), a message saying "fit the wheel" is outputted from the speaker 8. As shown in FIG. 13(b), the driver moves the wheel so that the estimated driving locus 20 is in accord with the fixed target locus 20a and presses the confirmation button 4c when the locus is fitted to the intended parking position. Then, again, the estimated driving locus 20 and the target locus 20a are shown on the display. The message "Please begin backing up now", two times of sounds of chime, and another message "maintain the steering wheel in position and reverse" follow. The driver backs up the vehicle while confirming the safety rearwardly by referring to the 50 centimeters reference line 20d (50 centimeters from the rear end of the vehicle) to complete the parking operation when the vehicle reaches the end 20c of the target locus 20a as shown in FIG. 13(e). When the driver want to back up further in the parking space 30, the transaction from Step S118 can be repeated.

In the Case of the Parallel Parking

Figure 18:
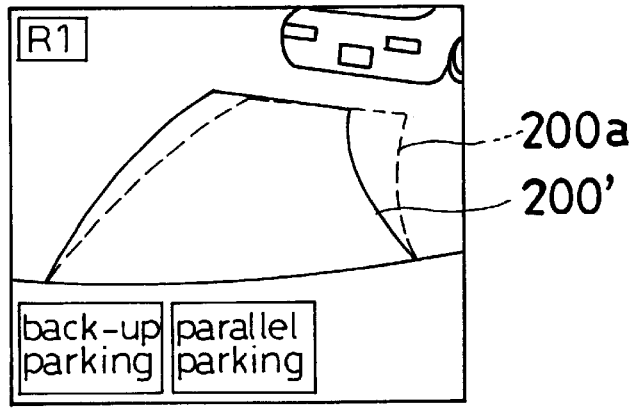
FIGS. 18(a)–(d) are operational explanatory views for the parallel parking as a follow up to FIG. 17 in the embodiment of this invention.
Figure 18:
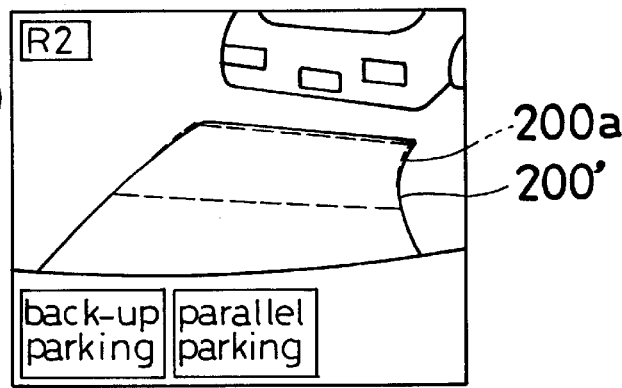
Figure 18:
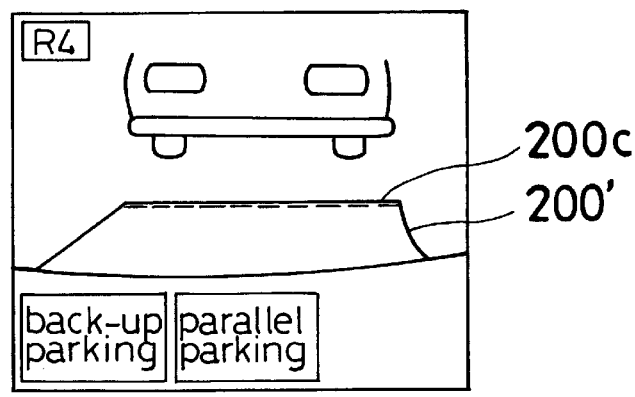
Figure 18:
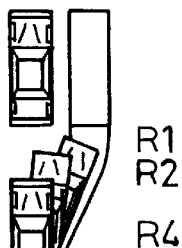

The sequence of parallel parking will be explained as follows referring to FIGS. 16 through 18. The characteristics of parallel parking are that the possibility for parking is judged referring to the S-shaped estimated driving locus 200, that the estimated driving locus 200 is set as the target locus 200a, and the direction is audibly and visually provided to the driver so that the vehicle traces the target locus 200a. In this case, when the vehicle is off the target locus 200a due to a delay in the steering operation or over steering, the vehicle can be operated to return to the target locus 200a referring to the estimated driving locus 200.

As shown in FIG. 16, the vehicle is stopped at position L1 (the vehicle has a 1 meter distance from a parked vehicle parallel to the vehicle in the initial position. Then the reverse mode is selected and it is confirmed that an obstacle does not exist in or near the estimated driving locus 200. A message saying "Direction for parallel parking" is outputted from the speaker 8. After a sound of chime 1, another message saying "Please turn the wheel, and when the parking space is confirmed press the confirmation button" is outputted from the speaker 8. The driver turns the wheel, examines the possible course for a parking operation, and presses the confirmation button 4c when a course suitable for parking as shown in FIG. 16(b) is found. When the confirmation switch 4c is selected, the color of the estimated driving locus 200 is changed from yellow to blue and the locus is fixed as the target locus 200a. Then a message saying "Please begin backing up now", a sound of chime 2, and another message saying "Please keep backing up" follows. In this condition, both the target locus 200a and the estimated driving locus 200 moving in accordance with the change of the steering angle are shown on the screen. When the wheel is turned left and the vehicle is backed up, as shown in FIG. 16(d), a message saying "watch front right direction" is outputted from the speaker 8. When the vehicle approaches a first wheel turning point PT as shown in FIG. 16(d) and the vehicle reaches the wheel turning point PT as shown in FIG. 17(a), the chime 2 rings along with the audio message saying "Please adjust the steering wheel to the locus" is outputted from the speaker 8. The driver turns the steering wheel so that the estimated driving locus 200 is in accord with the target locus 200a as illustrated in FIG. 17(b) and backs up the vehicle straight. When the vehicle position reaches S3 of FIG. 17(d) which is close to a second turning steering wheel position, the chime 2 and a message saying "Please maintain the wheel in this position and reverse" are outputted from the speaker. When the vehicle reaches the turning wheel position as shown in FIG. 18(a), the chime 1 and the message saying "Please adjust the wheel to the locus" are outputted from the speaker. Following the direction, the driver adjust the steering angle to be in accord with the target locus 200a. When backing up while turning right as shown in FIG. 18(b), another message saying "Please watch to left direction" is outputted. Since the vehicle is reaching the intended destination, the chime 1 rings as well as a message saying "Please watch rearward direction". When the vehicle reaches the final position as shown in FIG. 18(c), the parking operation is completed after shifting the shift lever to park.

When the parking operation is assisted in the foregoing manner, a predetermined voice signal determined by the synthetic voice circuit 7 is outputted from the speaker 8, a predetermined audio message in accordance with the operation situation is outputted to the driver, and the appropriate direction for the parking operation is provided by voice to appropriately assist an inexperienced driver who is not used to the parking operation.

In this embodiment, the above-mentioned assistant apparatus and the assistant method adapted to a parking assist apparatus, may be adapted to an assistant apparatus in the vehicle in reverse motion when the driver drives the car into a turnout temporarily.

According to this invention, a first estimated locus in accordance with the steering angle is shown on a display when starting parking operation, the driver fixes the first estimated locus at a predetermined condition, and a second estimated locus variable in accordance with the change of the steering angle is shown on the display by having the indicated first estimated locus as an target locus. Accordingly, this enables one to guide the second estimated locus to follow the fixed target locus and to operate the wheel so that the second estimated locus is in accord with the standardized target locus, which does not require a difficult operation irrespective of any parking operation.

When the direction is given based on the information from the target locus and a vehicle condition detecting means, the difference of the vehicle position from the target locus is calculated based on the information from the fixed target locus and the vehicle condition detecting means. Thus, an apparatus is provided for appropriately assisting the parking operation and providing an appropriate direction in accordance with the calculated difference and the positional relations.

When a first estimated locus is indicated in the direction that the driver intends to park and when there is no obstacle in the first estimated locus, the driver's intention for parking is accomplished by fixing the first estimated locus after confirming the safety during the parking operation.

While the preferred embodiments have been described, variations thereto will occur to those skilled in the art within the scope of the present inventive concepts which are delineated by the following claims.

What is claimed is:

1. An assistant apparatus for a vehicle in reverse motion comprising:

a camera for taking an image rearwardly of a vehicle during a parking operation;

an indication means for showing images from the camera as rearward images;

a vehicle condition detecting means for detecting the vehicle condition;

an estimated locus calculating means for calculating an estimated locus for a vehicle path based on information from the vehicle condition detecting means and the vehicle performance to indicate the estimated locus on the indication means superimposed on the rearward images;

a locus fixing means indicating a first estimated locus in accordance with a steering angle at the initial stage of parking and fixing the first estimated locus at a predetermined condition;

a target locus setting means setting the first estimated locust as a target locus for a vehicle path for parking in a parking space when the first estimated locus is fixed by the locus fixing means; and a guiding means indicating a second estimated locus varied in accordance with changes of the steering angle during A the parking operation on the indication means, superimposed on the target locus and the rearward images, to guide the second estimated locus to the target locus.

2. An assistant apparatus for a vehicle in reverse motion as set forth in claim 1, wherein the guiding means provides directions based on the information from the target locus and the vehicle condition detecting means.

3. An assistant apparatus for a vehicle in reverse motion as set forth in claim 2, wherein the predetermined condition includes a condition that there is no obstacle in the range of the first estimated locus when the first estimated locus is indicated in the direction that the driver intends to park.

4. An assistant apparatus for a vehicle in reverse motion comprising:

a camera for taking a rearward image of the vehicle during the reverse motion, a detecting means for detecting a vehicle condition for reverse motion, a calculating means for calculating an estimated reverse motion locus based on the vehicle condition and vehicle characteristics, and a display showing a latest estimated reverse motion locus as a present locus and one of the estimated reverse motion locus at a specific timing as a target locus for a vehicle path for parking in a parking space, with both the current and the target loci being superimposed onto the rearward image for guiding the current locus to the target locus.

5. An assistant apparatus for a vehicle in reverse motion as set forth in claim 4, wherein the detecting means detects a vehicle condition for reverse motion based on a steering angle and/or a wheel speed of the vehicle.

6. An assistant apparatus for a vehicle in reverse motion as set forth in claim 5, wherein the target locus is specified at a specific timing when the end of the estimated reverse motion locus coincides with an expected reverse direction and/or position of the vehicle.

7. An assistant apparatus for a vehicle in reverse motion as set forth in claim 6, further comprising a guiding means for guiding a driver of the vehicle to make the vehicle coincide with the target locus in voice and/or image.

8. An assistant apparatus for a vehicle in reverse motion as set forth in claim 5, further comprising a guiding means for guiding a driver of the vehicle to make the vehicle coincide with the target locus in voice and/or image.

9. An assistant apparatus for a vehicle in reverse motion as set forth in claim 4, wherein the target locus is specified at a specific timing when the estimated reverse motion locus coincides with an expected reverse direction and/or location of the vehicle.

10. An assistant apparatus for a vehicle in reverse motion as set forth in claim 9, further comprising a guiding means for guiding a driver of the vehicle to make the vehicle coincide with the target locus in voice and/or image.

11. An assistant apparatus for a vehicle in reverse motion as set forth in claim 4, further comprising a guiding means for guiding a driver of the vehicle to make the vehicle coincide with the target locus in voice and/or image.

12. An assistant apparatus for a vehicle in reverse motion comprising:

a camera for continuously taking a rearward image from the vehicle during the reverse motion, a detecting means for detecting a vehicle condition for reverse motion, a calculating means for calculating an estimated reverse motion locus based on the vehicle condition and vehicle characteristics, and a display showing the estimated reverse motion locus superimposed onto the rearward image, wherein one of the estimated reverse motion locus at a specific timing is fixed as a target locus for a vehicle path for parking in a parking space on the display, and the estimated reverse motion locus is continuously shown on the display while the target locus is shown on the display for guiding the current locus to the target locus even after the target locus is fixed.

13. An assistant apparatus for a vehicle in reverse motion as set forth in claim 12, wherein the detecting means detects a vehicle condition of the reverse motion based on a steering angle and/or a wheel speed of the vehicle.

14. An assistant apparatus for a vehicle in reverse motion as set forth in claim 13, wherein the target locus is specified at the specific timing when the end of the estimated reverse motion locus coincides with an expected reverse direction and/or position of the vehicle.

15. An assistant apparatus for a vehicle in reverse motion as set forth in claim 14, further comprising a guiding means for guiding a driver of the vehicle by voice and/or image to make the vehicle coincide with the target locus.

16. An assistant apparatus for a vehicle in reverse motion as set forth in claim 13, further comprising a guiding means for guiding a driver of the vehicle by voice and/or image to make the vehicle coincide with the target locus.

17. An assistant apparatus for a vehicle in reverse motion as set forth in claim 12, wherein the target locus is specified at the specific timing when the estimated reverse motion locus coincides with an expected reverse direction and/or location of the vehicle.

18. An assistant apparatus for a vehicle in reverse motion as set forth in claim 17, further comprising a guiding means for guiding a driver of the vehicle by voice and/or image to make the vehicle coincide with the target locus.

19. An assistant apparatus for a vehicle in reverse motion as set forth in claim 12 further comprising a guiding means for guiding a driver of the vehicle by voice and/or image to make the vehicle coincide with the target locus.

20. An assistant method for a vehicle in reverse motion comprising:

a first step for continuously taking a rearward image from the vehicle during the reverse motion, a second step for continuously detecting a vehicle condition of the reverse motion, a third step for continuously calculating an estimated reverse motion locus based on the vehicle condition and vehicle characteristics, and a fourth step for continuously showing the estimated reverse motion locus superimposed onto the rearward image, a fifth step for fixing one of the estimated reverse motion locus at a specific timing as a target locus for a vehicle path for parking in a parking space on the display, and a sixth step for further continuously showing the estimated reverse motion locus on the display while the target locus is shown on the display for guiding the current locus to the target locus even after the target locus is fixed.

21. An assistant method for a vehicle in reverse motion as set forth in claim 20, wherein the vehicle condition of the reverse motion is detected based on a steering angle and/or a wheel speed of the vehicle at the second step.

22. An assistant method for a vehicle in reverse motion as set forth in claim 21, wherein the target locus is specified at the specific timing when the end of the estimated reverse motion locus coincides with an expected reverse direction and/or position of the vehicle at the fifth step.

23. An assistant method for a vehicle in reverse motion as set forth in claim 22, further comprising a seventh step for guiding a driver of the vehicle by voice and/or image to make the vehicle coincide with the target locus.

24. An assistant method for a vehicle in reverse motion as set forth in claim 21, further comprising a seventh step for guiding a driver of the vehicle by voice and/or image to make the vehicle coincide with the target locus.

25. An assistant method for a vehicle in reverse motion as set forth in claim 20, wherein the target locus is specified at the specific timing when the estimated reverse motion locus coincides with an expected reverse direction and/or location of the vehicle at the fifth step.

26. An assistant method for a vehicle in reverse motion as set forth in claim 25, further comprising a seventh step for guiding a driver of the vehicle by voice and/or image to make the vehicle coincide with the target locus.

27. An assistant method for a vehicle in reverse motion as set forth in claim 20, further comprising a seventh step for guiding a driver of the vehicle to make the vehicle coincide with the target locus in voice and/or image.

* * * * *